Nov. 13, 1962 B. MARINUS 3,063,084
CAR WASHING ARTICLE WITH WATER DISTRIBUTING HEAD
Filed Sept. 27, 1960
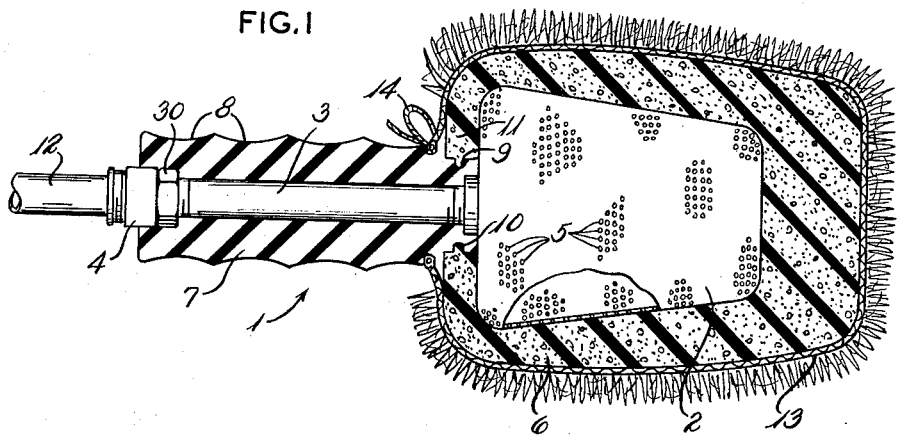
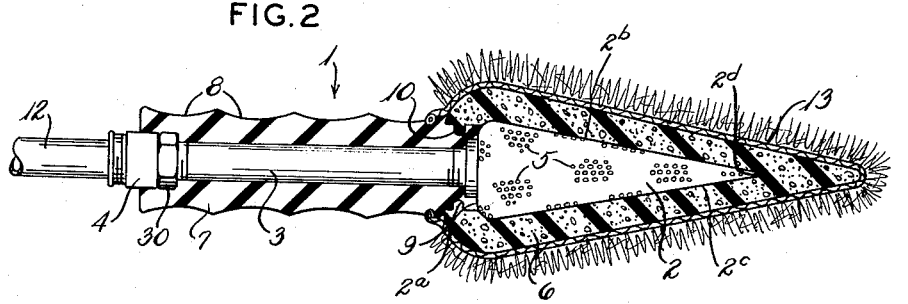
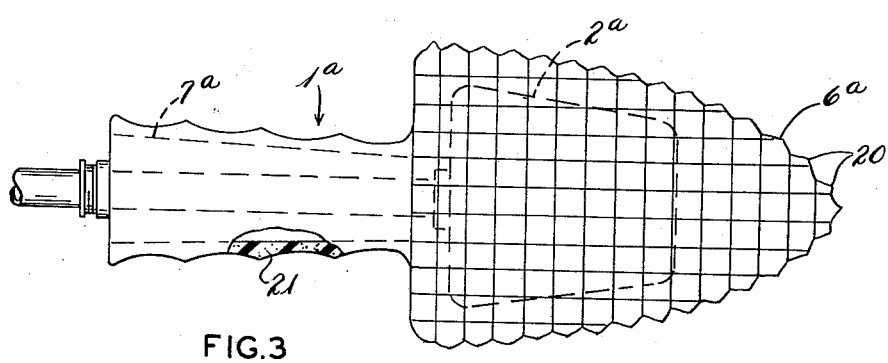
INVENTOR.
BERNARD MARINUS
BY Oldham & Oldham
ATTYS.

United States Patent Office 3,063,084
Patented Nov. 13, 1962

3,063,084
CAR WASHING ARTICLE WITH WATER
DISTRIBUTING HEAD
Bernard Marinus, Main P.O. Box 12652,
St. Petersburg, Fla.
Filed Sept. 27, 1960, Ser. No. 58,780
4 Claims. (Cl. 15—567)

The present invention relates to car washing articles and equipment, and especially to a type of a car washing device having a water distributing head provided therein.

Heretofore there have been various types of car washing units provided, one example of which being the car washing unit with water supply means shown in my previous United States Patent No. 2,940,102. While such car washing units, gloves or similar articles have provided satisfactory washing actions, it may be desirable to use a firmer unit, or one having more positive washing action than that secured by many of the prior types of manually used car wash articles.

The general object of the present invention is to provide a novel and improved type of a car washer characterized by the position control of the washing action obtained and by the varieties of constructions available for the car wash article.

Another object of the invention is to mold a porous water distributing member for enclosing a rigid water distributing head in a car wash unit.

Another object of the invention is to provide a novel and improved car washing device adapted for manual operation and wherein a soft resilient washer member is carried by a solid frame particularly adapted for convenient manual grasp therewith.

A further object of the invention is to provide a car washing article wherein it can be used with or without a removable cover thereon and wherein a roughened surface is provided on a resilient car wash member, which resilient member can be of any desired contour whereby a water supply means can be connected to a center of the resilient member for flow of water outwardly therethrough and with the roughened surface of the pad providing desirable cleaning action.

The foregoing and other objects and advantages of the invention will be made more apparent as the specification proceeds.

With reference to the accompanying drawings, one currently preferred embodiment of the invention is shown therein, and;

FIG. 1 shows a longitudinal section through the currently preferred embodiment of the car washing article of the invention taken in a horizontal plane therethrough and with portions thereof shown in elevation;

FIG. 2 is a vertical section taken through the car washing device of FIG. 1 with the fluid supply means at the center of the unit being shown in elevation; and FIG. 3 is a longitudinal section, similar to FIG. 1, of a modified type of car washing device of the invention.

In order to facilitate comparison between similar parts shown in the drawings and referred to in the specification, corresponding numerals are used to facilitate comparison and reference between such corresponding parts and means.

Generally speaking, the present invention relates to a car washing article that comprises a hollow, rigid water distributing head with a tubular base portion thereon and extending therefrom, hose connection means carried by such base portion and operatively connected to the head for water supply thereto, handle means engaging the tubular base portion and protruding from the base portion for support action for the article, which head has water distributing apertures provided therein and which tapers in thickness from said base portion thereof to a leading front edge thereof, and a resilient, porous cover secured around the distributing head for water flow therethrough and for cleaning action by the cover.

The details of the currently preferred embodiment of the invention will now be described and the car washer of the invention is indicated by the numeral 1. The car washer 1 includes a rigid water distributor, or head 2 and it has a tubular handle, or supply member 3 operatively connected to and extending from one end thereof. A hose connector member 4 suitably engages the tubular member 3 at the end thereof. The head 2 is preferably made from apertured sheet metal which preferably is made into a hollow chamber of substantially triangular shape in longitudinal section. A plurality of water distributing apertures or openings 5 are provided in the head 2 in suitably spaced portions thereof so that any cleaning liquid supplied to the supply handle, or tube 3 will flow to and from head 2 through the apertures therein. The head 2 has a base 2a, converging top and bottom surfaces 2b and 2c, respectively, and a pointed front end 2d.

It is another feature of the invention that a plastic, pervious, resilient cover 6 is provided for the entire surface of the distributor head 2. Such distributor head, while rigid, and having a fluid supplied thereto, has the soft cleaner member or cover 6 provided over the entire outer surface of the distributor head 2. Usually the cover is made from a latex rubber material, or it may be made from other cellular, plastic, or equivalent material made so that fluid can readily flow through the cells formed in the cover material 6. The cover 6 may be made by a molding, pouring, or casting action to the desired shape.

As another feature of the present invention, a handle 7 is associated with and encloses the tubular member 3. Such handle 7 preferably is provided with a plurality of recesses 8 on the surface thereof to facilitate manual engagement of the car washer 1 by the person using the washer unit. The handle 7 usually is formed in one piece and has the hose connector assembled into a center bore formed in the handle. An annular recess 9 is also formed in the handle 7 adjacent one end thereof, and a rib 10 on the cover 6 preferably is seated therein to aid in securing the cover 6 around and in good engagement with the distributor head 2. The resiliency in the cover 6 permits it to be stretched around into tight engagement with the distributor head 2 when assembling the components of the car washer 1. It should be noted that a protruding lip or edge may be formed on the cover 6 to extend axially of the car washer 1 a longer distance than the normal thickness of the cover 6 over the distributor head 2 and this aids in forming a resilient protective pad around the distributor head 2 for uniform flow of water through the car washer 1 for desired cleaning action.

It will be seen that a section 11 is formed on the cover 6 to enclose the rear edge and corner portions of the distributor head 2 whereby an effectively padded car washer is formed and in use it will not have any tendency to injure, scratch or mar an article being cleaned.

While the present invention is described with relation to a car washer article, it will be realized that the washing device of the invention can be used with any desired member for cleaning action and that normally a hose or other water supply member 12 would be connected to the coupling 4 to supply a cleaning liquid thereto and such cleaning liquid would flow through the distributor head 2 and out through the porous cover 6 in a substantially uniform flow over the area of the distributor head.

In FIGS. 1 and 2, preferably the car washer 1 is provided with a fabric bag or enclosure 13. This bag 13 completely covers and encloses the cover 6 and normally is secured to the handle 7, as by means of a draw string 14 whereby an effective, removable cleaning unit can be associated with the car washer 1. Hence if such bag 13 becomes dirty or discolored, it can be replaced with a new one or can be removed and washed, as desired.

FIG. 3 of the drawings shows a modified car washer 1a of the invention. Such car washer has a distributing head 2a provided therein of generally the same construction as that shown in FIGS. 1 and 2.

In the washer shown in FIG. 3, a cover 6a is provided and in this instance such cover 6a can be made, for example, from latex rubber foam or sponge and with the cover 6 having the shape of an arrowhead, or it may have other shapes, as desired, and with the cleaning portions of the cover 6 extending farther from the water distributing head 2a as shown. Furthermore, the surface of this cover 6a may be molded or roughened in shape, as indicated at 20 in the drawings whereby the corrugated or ribbed molded surface provided on this cover 6a will aid in cleaning action when the car washer 1a is in use.

Furthermore, a handle member 7a, in this instance, may be provided which is tapered inwardly in contour from its axially outer end towards the remainder of the washer 1a to facilitate a good convenient engagement and grasp of the washer by the user. Yet another feature of this modified structure is that the cover 6a may have a porous layer 21 extending over the handle 7a whereby better retention of the cover 6a in place is obtained by the natural resiliency and flexibility of the cover 6a plus the fact that when in use normally a person would grasp the base or tubular portion of the cover 6a and retain it in engagement with the handle 7a whereby an effective, soft grasp is provided but yet with an effective and positive cleaning action being obtained.

It should be observed that the cover 6a can be formed in other desired shapes, and with any suitable ribs or corrugations being formed on its surface so that a frictional cleaning action can readily be obtained.

From the foregoing, it will be seen that a relatively uncomplicated, but novel and improved washer unit has been provided by the invention. Such unit has desirable properties and can be readily assembled. The porous resilient cleaner means used in the washer will have a convenient and controllable water flow therethrough and with such flow normally being uniformly distributed over the surface of the unit. The tapered handle 7a of FIG. 3 may be used in FIGS. 1 and 2 construction, and the porous cover 21 of FIG. 3 may be used in FIGS. 1 and 2, when desired. If desired, a suitable control valve could be associated with the handle portion of the washer for control of fluid flow through the washer unit. The handles 7 and 7a can be retained from turning on the tubular members 3 and 3a in any suitable manner, such as by a lock nut 30 engaging a threaded section on the tube 3 adjacent the hose coupling 4 thereon. Hence it is believed that the objects of the invention have been achieved.

While two complete embodiments of the invention have been disclosed herein, it will be appreciated that modification of these particular embodiments of the invention may be resorted to without departing from the scope of the invention as defined in the appended claims.

What is claimed is:

1. A car washer comprising a hollow rigid apertured water distributing head, a water supply member connected to said head, handle means operatively carried by said member and protruding away from said head, and a porous resilient cover extending around said head and having an integral tubular section covering said handle means for the length thereof whereby said cover is retained in position by pressure on said handle means to grasp the car washer.

2. A car washer as in claim 1 where said cover has a ribbed outer surface in said head covering portion thereof for improved cleaning action thereby.

3. An article for washing actions comprising a hollow rigid wedge-shaped water distributing head having a pair of flat converging top and bottom surfaces, a relatively large base end and a pointed front end with a tubular portion in the base end thereof, hose connection means carried by said tubular portion and operatively connecting to said head, handle means engaging said base end and protruding from said head for support action therefor, said head having uniformly positioned water distributing apertures provided in the entire surface thereof, and a porous resilient cover secured to and around said head with said handle means protruding therefrom for convenient control of said article for cleaning action by said cover, said cover being of uniform thickness over said converging top and bottom surfaces and protruding forwardly from said head to form a generally triangularly shaped resilient front end for said cover of a length greater than the uniform thickness portion of said cover.

4. An article as in claim 3, where said tubular portion is permanently attached to said base end and has a member secured thereto and extending through a bore in said handle means to be retained in said bore at one end by said hose connection means being permanently operatively secured thereto, said handle means being confined against axial movement on said member by the hose connection means and tubular portion of said head.

References Cited in the file of this patent

UNITED STATES PATENTS

| | | |
|---|---|---|
| 1,218,081 | Hahn | Mar. 6, 1917 |
| 2,225,101 | Conk et al. | Dec. 17, 1940 |
| 2,237,793 | Rudd | Apr. 8, 1941 |
| 2,265,804 | Deady | Dec. 9, 1941 |
| 2,756,449 | Dewey | July 31, 1956 |
| 2,779,962 | Cooper | Feb. 5, 1957 |
| 2,822,562 | Shakelford | Feb. 11, 1958 |
| 2,940,102 | Marinus | June 14, 1960 |